(12) United States Patent
Kelly et al.

(10) Patent No.: US 12,204,959 B1
(45) Date of Patent: Jan. 21, 2025

(54) USING A SOFTWARE AGENT TO PROVIDE A HIGHER-LEVEL REMOTE PROCDURE CALL (RPC) MECHANISM

(71) Applicant: Rapid7, Inc., Boston, MA (US)

(72) Inventors: Emmett Kelly, Belfast (GB); Paul Miseiko, Mississauga (CA)

(73) Assignee: Rapid7, Inc., Boston, MA (US)

( * ) Notice: Subject to any disclaimer, the term of this patent is extended or adjusted under 35 U.S.C. 154(b) by 28 days.

(21) Appl. No.: 17/682,179

(22) Filed: Feb. 28, 2022

(51) Int. Cl.
G06F 9/54 (2006.01)
H04L 9/40 (2022.01)
H04L 67/02 (2022.01)

(52) U.S. Cl.
CPC .......... *G06F 9/547* (2013.01); *H04L 63/0428* (2013.01); *H04L 67/02* (2013.01)

(58) Field of Classification Search
CPC ...... G06F 9/547; H04L 63/0428; H04L 67/02
See application file for complete search history.

(56) References Cited

U.S. PATENT DOCUMENTS

| | | | |
|---|---|---|---|
| 2001/0025311 A1* | 9/2001 | Arai | H04L 63/1425 709/228 |
| 2001/0049752 A1* | 12/2001 | Kays, Jr. | G06F 9/547 719/330 |
| 2002/0019881 A1* | 2/2002 | Bokhari | H04L 67/5682 709/217 |
| 2002/0046232 A1* | 4/2002 | Adams | G06F 16/1834 709/200 |
| 2002/0087657 A1* | 7/2002 | Hunt | H04L 67/306 709/217 |
| 2002/0107067 A1* | 8/2002 | McGlone | G07F 17/3202 463/20 |
| 2002/0133738 A1* | 9/2002 | Zeigler | G06F 11/0796 714/E11.017 |
| 2003/0037180 A1* | 2/2003 | Madineni | G06F 9/542 719/321 |
| 2003/0078916 A1* | 4/2003 | DeForeest | G06F 16/252 |
| 2004/0085327 A1* | 5/2004 | Jones | G09B 29/003 345/591 |
| 2006/0074710 A1* | 4/2006 | Funk | G06Q 10/10 705/2 |
| 2006/0230148 A1* | 10/2006 | Forecast | H04L 69/14 709/226 |
| 2008/0094410 A1* | 4/2008 | Jiao | G06T 15/503 345/592 |
| 2011/0093954 A1* | 4/2011 | Lee | H04L 63/1433 709/224 |
| 2013/0174208 A1* | 7/2013 | Lee | H04N 21/43637 725/109 |
| 2014/0237596 A1* | 8/2014 | Grytsan | G06F 21/566 726/23 |
| 2018/0157842 A1* | 6/2018 | Holz | G06F 16/338 |
| 2018/0157860 A1* | 6/2018 | Nair | G06F 21/6218 |
| 2020/0082094 A1* | 3/2020 | Mcallister | G06F 8/77 |

* cited by examiner

Primary Examiner — Tuan C Dao
(74) Attorney, Agent, or Firm — Ashwin Anand

(57) ABSTRACT

A software agent executing on a computing device receives a high-level command from a client and converts the high-level command into multiple low-level commands. The software agent executes individual low-level command on the computing device and sends a result of executing the individual low-level command to the client until each low-level command has been executed.

20 Claims, 4 Drawing Sheets

USING A SOFTWARE AGENT TO PROVIDE A HIGHER-LEVEL REMOTE PROCDURE CALL (RPC) MECHANISM

BACKGROUND

Many companies operate private computer networks that are connected to public networks such as the Internet. While such connections allow company users to easily access resources on the public networks, they also create vulnerabilities in the company network. For example, company users may unwittingly download malicious content (e.g., data, files, applications, programs, etc.) onto the company network from untrusted sources on the Internet. As another example, interactions of company users with the public network may provide opportunities for malicious actors to attack the company network. A malicious actor can plant spyware, viruses, or other types of malicious software in a company's private network though a variety of interactive means, in order to steal sensitive information from the company or even gain control of the company's computing systems. As a result, enterprise security systems have become increasingly important to protect company networks against these types of vulnerabilities.

Some enterprise security systems operate by periodically collecting data from computing resources in the company network, in order to monitor these resources. Unfortunately, large scale configuration and management of these data collections continues to present significant challenges. Typically, data collection requirements for a resource does not remain static over time. For example, additional data may be needed for a particular machine to perform a more specific assessment of that machine, based on the results of an earlier assessment. It is generally difficult to know in advance what data is needed from a machine to perform an ongoing comprehensive assessment of that machine. Over-collection of data from the machine is undesirable as it places excessive strain on the collection pipeline. On the other hand, under-collection of data is also undesirable since it prevents the assessment system from properly monitoring the machine.

Assessing a remote device (e.g., a physical device or a virtual machine) for security issues may include collecting data from the remote system. Retrieving this data may take a long time depending on a number of factors including, for example, network latency, an amount of data being retrieved, a size of the data, a number of round trips the network protocol uses to collect each piece of data, and the like. When collecting data across a network with a large amount of latency, collecting a large amount of data, using a protocol that requires a large number of round trips for each piece of data to be collected, or any combination thereof, a security scan may take a significant amount of time. For example, users may each belong to one or more groups, with each user having associated information, such as a username, permissions, and the like. Thus, to determine user information, a request may be sent requesting the names of all groups. After all the groups have been received, a request may be sent requesting the members of each group. After receiving the members of a particular group, a request may be sent to determine the information associated with a member of the particular group. Thus, at least 3 requests may be sent and 3 responses may be received to obtain the information for one member of one particular group. This process is repeated for each member of each group. In this example, the data being determined may be relatively small but sending and receiving multiple messages across a network may result in a significant delay. In total, this operation may take 3+(3×N) round trips to enumerate all user information, where N is the total number of users.

SUMMARY OF THE DISCLOSURE

This Summary provides a simplified form of concepts that are further described below in the Detailed Description. This Summary is not intended to identify key or essential features and should therefore not be used for determining or limiting the scope of the claimed subject matter.

In some examples, a software agent executing on a computing device receives a high-level command from a client and converts the high-level command into a plurality of low-level commands. The software agent executes individual low-level commands of the plurality of low-level commands on the computing device, determines a result of executing the individual low-level commands on the computing device, and includes the result of executing the individual low-level commands in an accumulated result. In some cases, the software agent sends a result of executing an individual low-level command (of the plurality of low-level commands) as the results are obtained. In this way, the results of the plurality of low-level commands are not accumulated as accumulating the results may result in a large file that may fill up a memory or a storage area of the computing device. In other cases, the software agent may accumulate the results of executing the individual low-level commands and send the accumulated results as a response to the request.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
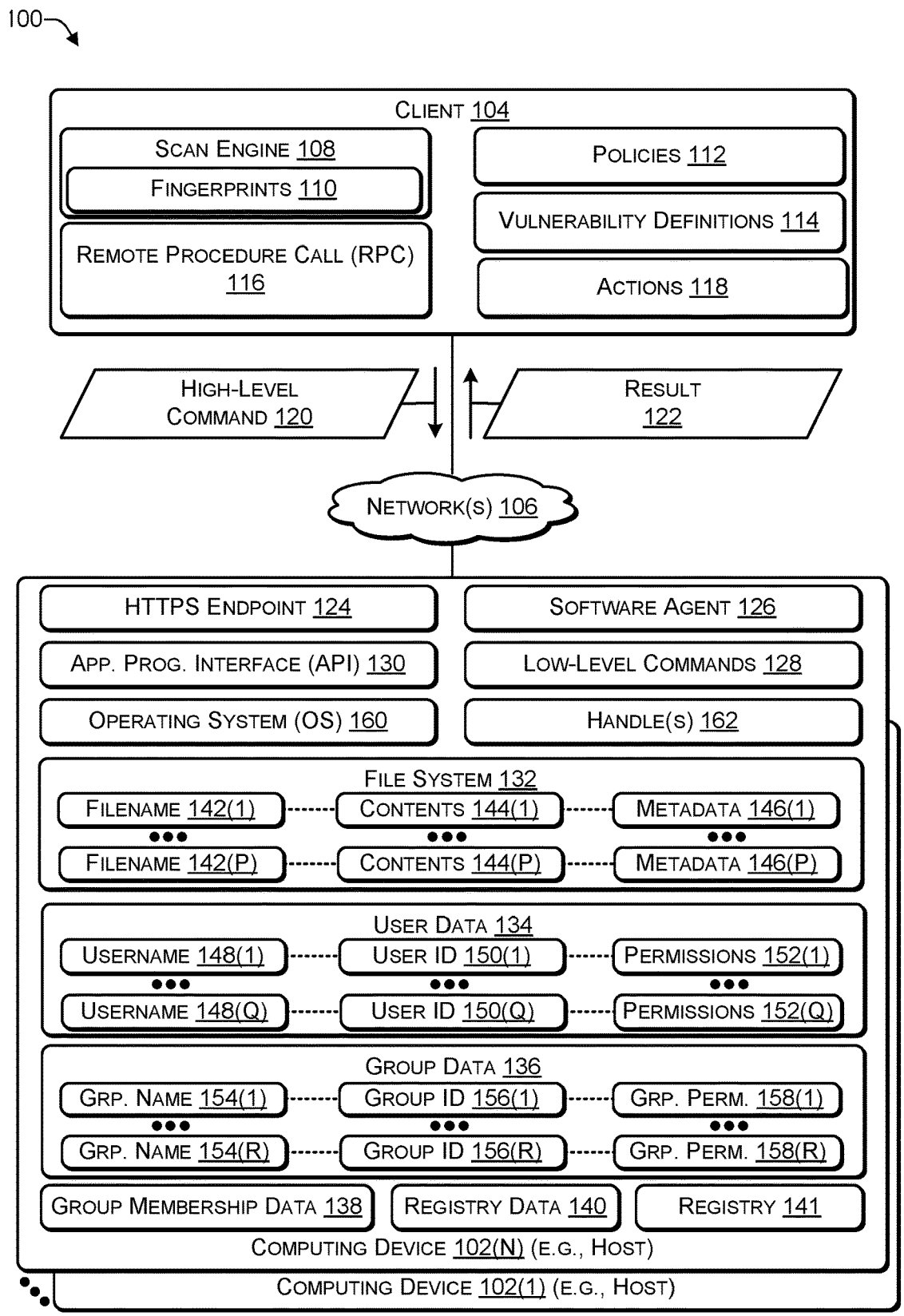
FIG. 1 is a block diagram of a system that includes a client hosting a scan engine to scan one or more computing devices for policy compliance and vulnerabilities, according to some embodiments.

The systems and techniques described herein enable multiple step operations to be performed via a single application programming interface (API) call. The multiple step operations are carried out by an agent installed on a remote system. By instructing the agent to perform the multiple steps, the number of round trips between a client requesting the data and a computing device providing the data is reduced significantly, thereby reducing the time taken to obtain the data. A round trip includes (i) the client sending a command (e.g., requesting data) to the computing device and (ii) the computing device sending a response (e.g., with the requested data) to the client.

A software application on first device may use a handle, e.g., an abstract reference, to access a resource on a second device. For example, the software application may use the handle to access a resource, such as portions of memory, being managed by another system, such as an operating system on the second device. A handle may be used to access a resource, such as a file descriptor, a network socket, a database connection, a process identifier (PID), a job ID, or another type of resource. While a pointer includes the address of the item to which it refers, a handle is an abstraction of a reference. For example, what is referenced by the handle can be relocated in memory (e.g., by the system) without invalidating the handle. Because access to a resource via a handle is controlled by another system, a handle functions as a capability. The handle identifies an object as well as the associated access rights. For example, when a computing device provides a handle to a client, the computing device grants the client access to the object referenced by the handle.

The systems and techniques described herein enable a network protocol remote procedure call (RPC) workflow to be performed locally (e.g., at the computing device) to reduce the impact of network latency. An RPC is when a software application executing on a client causes a software procedure to execute on another computer (e.g., a computing device or the like). The RPC is coded as if it were a normal (e.g., a local) procedure call, providing details for the remote execution. An RPC is a form of inter-process communication (IPC), in that a first process executing on a client is communicating with a second process on a computing device. For example, assume a client collects data from a computing device. Typically, an Operating System (OS) executing on the computing device provides an API for obtaining the data. For example, to obtain all user identifiers (userids) on the computing device, the client may:

| client | computing device |
| --- | --- |
| -> request OS handle | <- send OS handle |
| -> request user identifiers (IDs) | <- send user IDs |
| for each user ID: | |
|    -> request user handle | <- send user handle |
|    -> request user information | <- send user information |
|    -> request to return user handle | <- send accept returning user handle |
|    -> request to return OS handle | <- send accept returning OS handle |

In this example, this operation takes 3+(3×N) round trips to enumerate all of the user information, where N is the total number of users. In systems with high latency, these round trips are expensive (e.g., in terms of input/output bandwidth) and time consuming. The systems and techniques enable the client to send a single request to a software agent installed on the computing device. The software agent receives the single request and performs multiple local requests, and sends the individual results back to the server as they are received:

| server | agent | computing device |
| --- | --- | --- |
| -> request user data | -> request OS handle | <- send OS handle |
| | -> request user IDs | <- send user IDs |
| | for each user ID: | |
| |   {-> request user handle (UH) | <- send user handle |
| |   -> request user information | <- send user information |
| |   -> request return UH | <- send accept returning UH} |
| | -> request return OS handle (OSH) | <- send accept return OSH |
| | <- send all user data | |

Note that the operations {→request . . . UH} are performed for each user identifier while the other operations are not repeated for each user identifier.

The systems and techniques described herein increase (e.g., improve) the rate at which operations can be performed, particularly in high latency networks. For example, in the example operation of enumerating all users on an operating system, using the systems and techniques described herein may result in up to a 99% reduction in time taken to request all user data.

As an example, a software agent executing on a computing device receives a high-level command from a server. For example, the software agent may receive the high-level command at a Hypertext Transfer Protocol Secure (HTTPS) endpoint on the computing device. An HTTPS endpoint is a location from which an application programming interface (API) can access various resources on the computing device. The software agent converts the high-level command into a plurality of low-level commands. For example, the plurality of low-level commands may include: a handle request to the operating system requesting an operating system handle; a user request to the operating system requesting a user handle; a file request to the operating system requesting a file name; a group request to the operating system requesting a group name; or any combination thereof. The software agent executes individual low-level commands of the plurality of low-level commands on the computing device. For example, the software agent may execute individual low-level commands using an application programming interface (API) of an operating system of the computing device. The software agent determines a result of executing the individual low-level commands on the computing device, and includes the result of executing the individual low-level commands in an accumulated result. For example, the accumulated result may include one of: contents of individual files of a plurality of files stored on the computing device, metadata associated with the plurality of files, a plurality of user identifiers of users that are permitted to access the computing device, a plurality of user permissions associated with users that are permitted to access the computing device, a plurality of group names associated with groups defined on the computing device, a plurality of group identifiers associated with groups defined on the computing device, a plurality of group permissions associated with groups defined on the computing device, group membership data associated with groups defined on the computing device, registry data associated with a registry of an operating system installed on the computing device, or an output of executing a command line application on the computing device. After executing each low-level command of the plurality of low-level commands, the software agent sends the accumulated result to the server. A single roundtrip across a network that connects the client to the computing device includes: (1) the software agent receiving the high-level command from the client and (2) the software agent sending the individual results of executing the low-level commands to the client. The individual results are sent to the client as a response to a remote procedure call invoked by a software application executing on the client.

FIG. 1 is a block diagram of a system 100 that includes a client hosting a scan engine to scan one or more computing devices for policy compliance and vulnerabilities, according to some embodiments. The system 100 includes multiple computing devices 102(1) to 102(N) (N>0, collectively referred to as the computing devices 102) connected to at least one client 104 via at least one network 106 (e.g., the network 106 may include a local area network (LAN), a wide area network (WAN), and the like). The computing devices 102 may include hardware devices, virtual machines (VMs), or any combination thereof.

The client 104 includes a scan engine 108 that determines and stores fingerprints 110 associated with the computing devices 102. Each of the fingerprints 110 may represent a particular state corresponding to each of the computing devices 102. The scan engine 108 may periodically determine a fingerprint of each of the computing devices 102 and compare the fingerprint to known fingerprints that indicate either a vulnerability or a policy compliance result.

The client 104 may include policies 112. For example, the policies 112 may include United States Government Configuration Baseline (USGCB) policies, Federal Desktop Core Configuration (FDCC) policies, Center for Internet Security (CIS) policies (e.g., benchmarks, security configuration guidelines, and the like), network and information systems (NIS) directive, European Cybersecurity Strategy policies, a set of custom policies designed by an enterprise, and the like. The scan engine 108 may determine whether individual ones of the computing devices 102 comply with one or more of the policies 112. For example, if the computing devices 102 are associated with an enterprise (e.g., a large corporation), then the scan engine 108 may determine whether the computing devices 102 comply with the policies provided by the enterprise.

The client 104 may include vulnerability definitions 114. The scan engine 108 may specifically scan the computing devices 102 to determine whether individual computing devices 102 include one or more of the vulnerability definitions 114. The vulnerability definitions 114 may identify potential weaknesses which can be exploited by an unauthorized user to perform unauthorized actions to a computing device, such as the computing devices 102.

The client 104 may include actions 118. The actions 118 may specify actions to be performed by the client 104, the computing devices 102, or a combination of both to address a breach of the policies 112 or a discovery of one of the vulnerability definitions 114. For example, if a particular computing device of the computing devices 102 does not comply with a particular policy of the policies 112 (or includes one of the vulnerability definitions 114), then the client 104, the particular computing device 102, or both may perform one or more of the actions 118 to bring the particular computing device 102 into compliance with the particular policy (or to prevent exploitation of the vulnerability definitions 114). For example, the actions 118 may include reporting that one or more vulnerabilities were identified in the computing devices 102, one or more policy compliance issues were identified in the computing devices 102, or both.

The scan engine 108 may use a remote procedure call (RPC) 116 to cause a high-level command 120 to be sent to and executed on one of the computing devices 102. For example, the high-level command 120 may be sent to a hypertext transfer protocol secure (HTTPS) endpoint 124 on one of the computing devices 102. An HTTPS endpoint is a location from which an application programming interface (API) 130 can access various resources on the computing devices 102.

Each of the computing devices 102 may include the HTTPS endpoint 124, a software agent 126, the API 130, and an operating system 160. The software agent 126 may monitor (e.g., listen to) the HTTPS endpoint 124 to receive the high-level command 120. The software agent 126 may convert the high-level command 120 into multiple low-level commands 128. For example, if the high-level command 120 is requesting all user data, then the low-level commands 128 may include asking the operating system 160 for the user identifiers associated with the computing device 102(N) and requesting user information for each of the user identifiers. In some cases, the low-level commands 128 may include requesting at least one handle 162. For example, the low-level commands 128 may include a request for a handle associated with the operating system 160, a request for a user handle associated with each user, and the like.

Each of the computing devices 102, such as the computing device 102(N), may include a file system 132 with one or more files having filenames 142(1) to 142 (P (P>0). Each of the filenames 142 may have associated contents 144 and associated metadata 146. Each of the computing devices 102, such as the computing device 102(N), may include user data 134. The user data 134 may include one or more usernames 148(1) to username 148(Q) (Q>0). Each username 148 may have an associated user identifier 150 and associated permissions 152 identifying which objects, such as the filenames 142, each user identifier is authorized to access and the type of access. Each of the computing devices 102, such as the computing device 102(N), may store group data 136. The group data 136 may include one or more group names 154(1) to 154(R) (R>0). Each group name 154 may have an associated group identifier 156 and associated group permissions 158. Of course, each of the computing devices 102 may include additional objects in addition to the contents of the file system 132, the user data 134, and the group data 136. The file system 132, the user data 134, and the group data 136 are merely provided as examples of how the high-level command 120 is converted to multiple low-level commands 128 that are executed by the software agent 126 on the computing device 102 and then sent back to the client 104 as results 122 of performing the high-level command 120.

For example, the high-level command 120 may request the user identifier of each user on the computing device 102(N). The software agent 126 may convert the high-level command 120 into one or more low-level commands 128 that request the usernames 148 of each user. The software agent 126 may use the low-level commands 128 to request the user identifiers 150(1) to 150(Q) associated with each of the usernames 148(1) to 148(Q), respectively. The high-level command 120 may request the permissions of each user on the computing device 102(N). The software agent 126 may convert the high-level command 120 into one or more low-level commands 128 that request the permissions 152(1) to 152(Q) associated with each of the usernames 148(1) to 148(Q), respectively. For example:

| Client 104 | Agent 126 | Device 102 |
|---|---|---|
| -> request all user data | -> request OS handle | <- send OS handle |
| | -> request user IDs | <- send user IDs 150 |
| | for each user ID 150(1) to (Q): | |
| | {-> request user handle (UH) | <- send user handle |
| | -> request user information | <- send user information |
| | -> request return UH | <- send accept returning UH} |
| | -> request return OS handle | <- send accept return OS handle |
| | <- send all user data | |

Note that the operations {→request . . . UH} are performed for each user identifier 150 while the other operations are not repeated for each user identifier In this example, the high-level command 120 comprises "request all user data". The low-level commands 128 are the commands performed by the agent 126 from "request OS handle" (e.g., requesting a handle to the OS 160) to "request return OS handle" (e.g., returning the handle to the OS 160). The result 122 comprises "all user data".

As another example, the high-level command 120 may request the contents 144 of each of the filenames 142, and the software agent 126 may convert the high-level command 120 into low-level commands 128, with each of the low-level commands 128 requesting the contents of each of the filenames 142(1) to 142(P). To illustrate, a first low-level command may request the contents 144(1) of the file 142(1) and a Pth low-level command may request the contents 144(P) of the file 142(P). The results 122 that the software agent 126 sends back to the scan engine 108 (e.g., via the remote procedure call 116) may include at least a portion of the contents 144(1) to 144(P). As another example, the high-level command 120 may request the metadata 146 of each of the filenames 142, and the software agent 126 may convert the high-level command 120 into low-level commands 128, with each of the low-level commands 128 requesting the metadata 146 of each of the filenames 142(1) to 142(P). To illustrate, a first low-level command may request the metadata 146(1) of the file 142(1) and a Pth low-level command may request the metadata 146(P) of the file 142(P). The results 122 that the software agent 126 sends back to the scan engine 108 (e.g., via the remote procedure call 116) may include at least a portion of the metadata 146(1) to 146(P).

As a further example, the high-level command 120 may request group information such as group identifiers and group permissions. The software agent 126 may convert the high-level command 120 into one or more low-level commands 128, including requesting each of the group names 154 and then for each group name 154, requesting the group identifier 156, the group permissions 158, or both and then returning the results 122 that include the group identifiers 156, the group permissions 158, or both.

Each of the computing devices 102, such as the computing device 102(N), may include group membership data 138 and registry data 140. The group membership data 138 identifies which users and sub-groups belong to each group. The registry data 140 includes information about a registry 141 associated with the operating system 160. The registry 141 is an information repository that is implemented, for example, as a hierarchical database, to store low-level settings for the operating system 160 and for applications that choose to use the registry. For example, a kernel, device drivers, services, security accounts manager, user interfaces, and the like may use the registry 141. The registry 141 may enable access to counters for profiling system performance.

The registry data 140 may include information associated with the registry 141 including when the registry 141 was last modified, which user (or process) last modified the registry 141, and the like. The registry 141 may include information, settings, options, and other values for programs and hardware installed on all versions of a particular type of operating systems (e.g., Microsoft® Windows®). For example, when a software application is installed, a new subkey containing settings such as a program's location, program version, and how to start the program, may be added to the registry 141.

The group membership data 138 and registry data 140 may be used by the software agent 126, via the low-level commands 128, to obtain various types of data, such as, for example, data related to the file system 132, user information related to the user data 134, group information related to the group data 136, and the like.

As shown, the system 100 includes the software agent 126 and the scan engine 108, which can communicate with each other over network 106. The software agent 126 may be installed and executing on a remote machine 102(N) to collect and report machine characteristics data of the remote machine to the scan engine 108. In some embodiments, the client 104 may be implemented as a cloud-based or network-accessible service, which is configured to receive machine characteristics data from a large number of different (e.g., N) agents and perform security vulnerability assessments on remote machines based on the received data. Each software agent 126 may be uniquely associated with a remote machine 102, and each software agent 126 may be assigned a unique agent ID that identifies the software agent 126 to the scan engine 108.

In some embodiments, the software agent 126 may be implemented as a lightweight software module on the individual computing devices 102. Different types of agents 120 may be implemented for different machine platforms, such as WINDOWS®, LINUX®, or MAC® machines. In some embodiments, the software agent 126 may be designed to run on a different computing system from a particular computing device that is being monitored. In that case, the software agent 126 may be configured to establish network connections to the particular computing device and collect machine characteristics data over these network connections.

In some embodiments, the software agent 126 may be configured to collect a set of machine characteristics of individual computing devices 102. The collected machine characteristics may include information that indicates the machine's operating system (OS) version, OS patches installed on the machine, installed applications and their version information, patches, settings, and metadata, files or file contents on the machine, and configuration data such as the machine's registry entries, security settings, usage data, etc., among other information.

In various embodiments, the network(s) 106 may encompass any suitable combination of networking hardware and protocols necessary to establish communications between the software agent 126 and the client 104. In some embodiments, the computing devices 102 may execute in a private network of a company, behind a company firewall, and the network 106 may include a public network such as the Internet, which lies outside the firewall. The network 106 may encompass the different telecommunications networks and service providers that collectively implement the Internet. In some embodiments, the network 106 may also include private networks such as private local area networks (LANs), private wide area networks (WANs), or private wireless networks. The network 106 may be implemented using different hardware (e.g., modems, routers, switches, load balancers, proxy servers, etc.) and software (e.g., protocol stacks, accounting software, firewall/security software, etc.) for establishing networking links between the computing devices 102 and the client 104.

As shown, data 142 about the computing devices 102 may be transmitted over the network 106 and received by the client 104. In some cases, the data included in the result 122 may be formatted as objects in JavaScript Objection Notation (JSON). The client 104 may receive result 122 from many agents 126 and perform a series of tasks to ingest the result 122. Such tasks may include authenticating the sender of the data, unpacking the incoming data, parsing and/or perform certain initial processing of the data, and storing the data in a local data repository. In some embodiments, where the result 122 is received from different customers or companies, the data included in the result 122 may be stored in an encrypted form.

The computing devices 102 may include different types of computing resources, such as a workstation, a server, a mobile device, a virtual machine, or the like. The virtual machine may be an instance of an emulated computer that is hosted on a physical virtual machine host. The virtual machine host may implement virtualization hardware and/or software (e.g., hypervisors) to execute and manage multiple instances of guest operating systems. Example implementations of such virtualization technologies include VMWARE ESX/ESXI, MICROSOFT HYPERV, AMAZON WEB SERVICES, and MICROSOFT AZURE. As another example, another type of virtualized execution environment is the container, which provides a portable and isolated execution environment over a host operating system of a physical host. Example implementations of container technologies include DOCKER, GOOGLE KUBERNETES, AMAZON WEB SERVICES, and MICROSOFT AZURE. Each of these types of machines or execution environments may be monitored via the software agent 126. As may be appreciated, the software agent 126 may be implemented on other types of computing systems, including embedded systems, networking devices, storage devices, Internet-of-Things (IoT) devices, vehicles, and the like.

In some embodiments, the software agent 126 may collect different types of file metadata for particular files, including file size, file access time, file creation time, computed file hash values or checksums, etc. In some embodiments, the file permissions data that is collected on a WINDOWS machine may include a file's Discretionary Access Control List (DACL) for file access control and System Access Control List (SACL) for file access auditing. On a UNIX machine, collected file permission data may include a file's owner ID or name, group ID or name, mode (read/write/execute by world/group/owner), any special permission metadata on variants of UNIX platforms, and Access Control List (ACL) extensions on UNIX systems that support ACLs.

In some embodiments, the software agent 126 may be instructed to collect security configuration settings on the remote computing devices 102. For example, on a WINDOWS machine, such security configuration settings may include configuration settings found under WINDOWS Group Policy Objects for both local GPOs and domain GPOs, for those machines that members of a domain. For UNIX machines, the security configuration settings may include output of the sysctl system call executed on the machine; the firewall configuration, file system configuration, kernel configuration of the machine, and the configuration of one or more services such as Secure Shell (SSH).

In some embodiments, the software agent 126 may be instructed to collect the output of a program (e.g. a script) on the remote machine. In some embodiments, the agent may be configured to invoke programs or scripts in order to perform the data collection. The program may be for example a shell script, a bash script on a UNIX machine or a PowerShell script on a WINDOWS machine. Depending on the embodiments, script programs written in other programming languages may also be used to generate collected data.

In some embodiments, the software agent 126 ("agent") may be instructed to collect data by using a third-party library (e.g. a system library associated with the machine's operating system). Such third-party library may include, for example, kernel32.dll on WINDOWS or libaudit on LINUX. These libraries may be invoked on the machine in different ways. In some embodiments, the library may be loaded within the agent's process memory and invoked directly by the agent. In some embodiments, the library may be loaded in an isolated child process of the agent and called by the child process for data collection purposes. In some embodiments, the library may be called outside of the agent's memory as an external process (e.g., for a separate application). In some embodiments, the separate application may be one that is compiled by the agent for data collection purposes. In some embodiments, the separate application for data collection may be bundled with the agent (e.g., either as an initial install with the agent or downloaded as a subsequent patch).

Thus, an application executing on a client, such as a scan engine, may perform a remote procedure call and pass a high-level command to a software agent executing on a computing device. The computing device is connected to the client via a network. The software agent receives the high-level command and converts the high-level command to multiple low-level commands. The software agent executes each of the low-level commands locally, on the computing device itself (e.g., without incurring any network latency), and sends results of executing the low-level commands as a single aggregated result. The result of the high-level command is sent back to the application executing on the client via the remote procedure call. In this way, a single round trip of messaging is performed, e.g., sending the high-level command and receiving the aggregated results, resulting in a significant reduction in the number of commands sent across the network.

Figure 2:
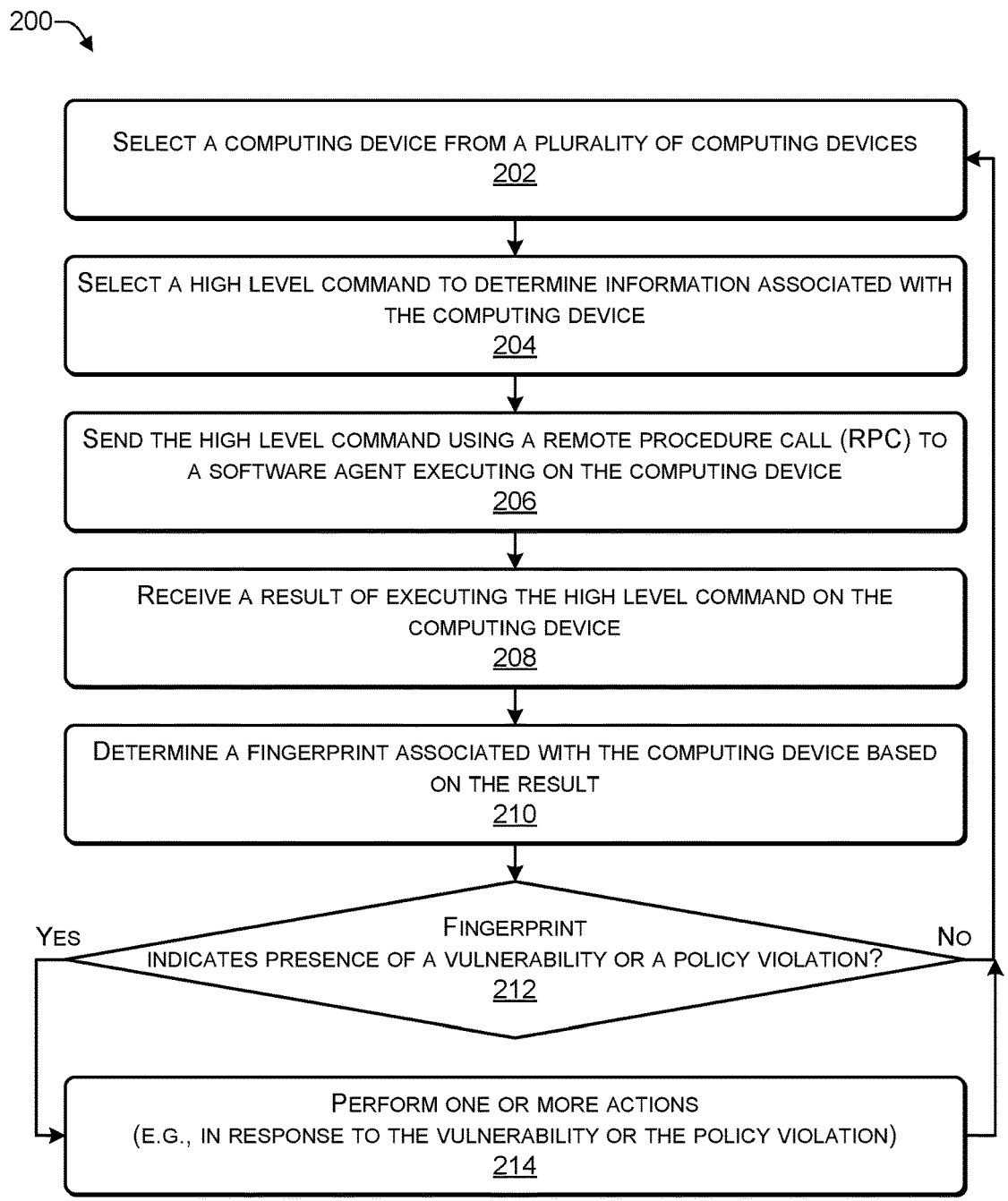
FIG. 2 is a flowchart of a process that includes sending a high-level command to a computing device, according to some embodiments.
Figure 3:
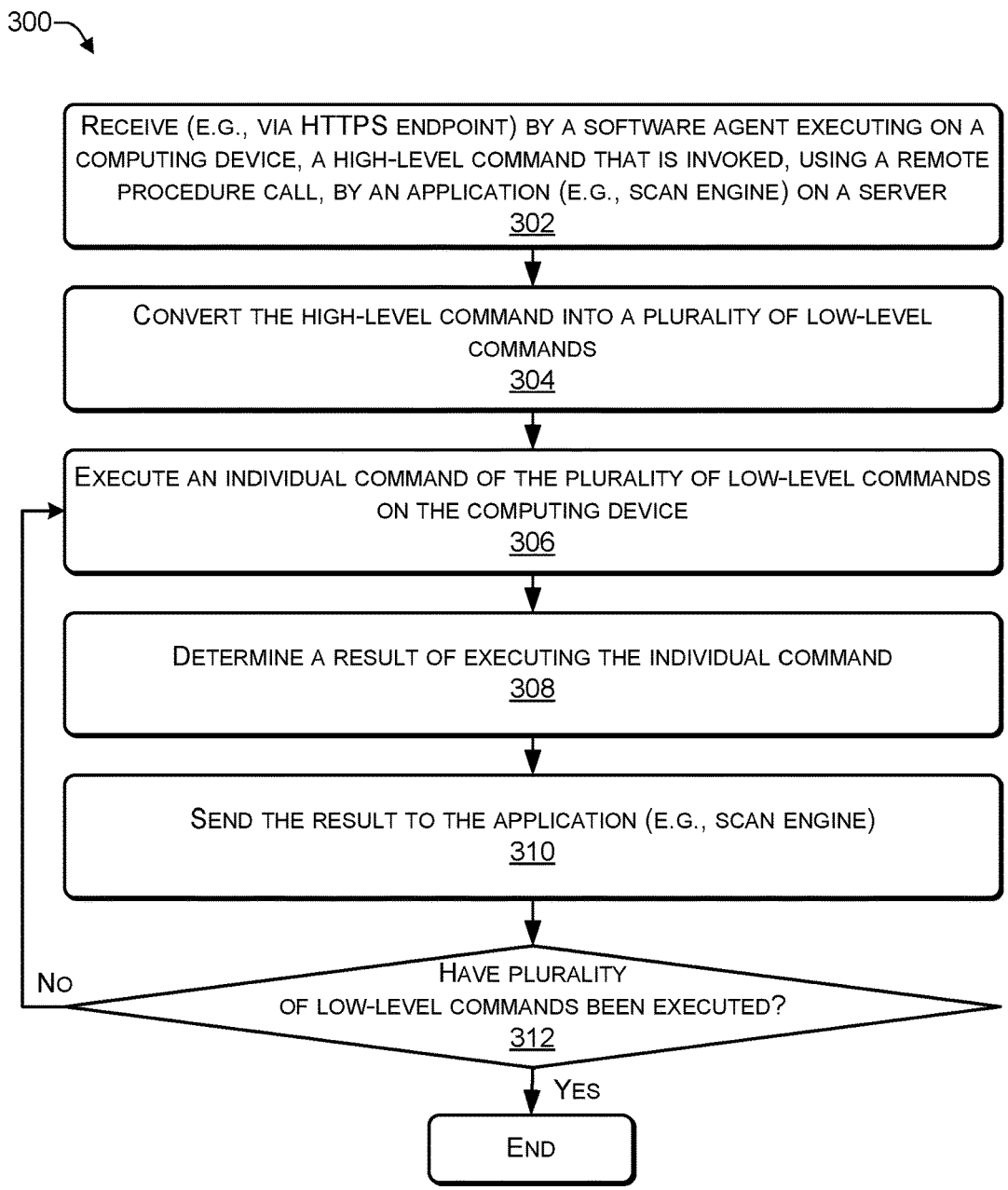
FIG. 3 is a flowchart of a process that includes converting a high-level command into a plurality of low-level commands, according to some embodiments.

In the flow diagrams of FIGS. 2 and 3, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 200 and 300 are described with reference to FIG. 1, as described above, although other models, frameworks, systems and environments may be used to implement these processes.

FIG. 2 is a flowchart of a process 200 that includes sending a high-level command to a computing device, according to some embodiments. The process 200 may be performed by the client 104 of FIG. 1.

At 202, the process selects a computing device from a plurality of computing devices. For example, in FIG. 1, the client 104 may select the computing device 102(N) (N>0).

At 204, the process selects a high-level command to determine information associated with the computing device. For example, in FIG. 1, the client 104 may select a high-level command to determine, for example, contents of each file hosted by (e.g., stored in a memory of) the computing device, metadata associated with each file hosted by the computing device, user data (e.g., usernames, user identifiers, user permissions, and the like) associated with each user associated with the computing device, group data (e.g., group names, group identifiers, group permissions, and the like) associated with each group associated with the computing device, and the like.

At 206, the process sends the high-level command using a remote procedure call (RPC) to a software agent executing on the computing device. For example, in FIG. 1, the client 104 sends, via the remote procedure call 116, the high-level command 120 to the HTTPS endpoint 124 of the selected computing device 102(N). The software agent 126 is listening to and receives the high-level command 120 via the HTTPS endpoint 124.

At 208, the process receives a result of executing the high-level command on the computing device. For example, in FIG. 1, after sending, via the remote procedure call 116, the high-level command 120 to the software agent 126, the software agent 126 may convert the high-level command 120 to multiple low-level commands 128, execute each of the low-level commands 128 on the computing device 102(N), and return the result 122 that includes the results from executing each of the low-level commands 128. In some cases, the result 122 may be returned by the remote procedure call 116 to the application, such as the scan engine 108, that sent the high-level command 120 as a result of the remote procedure call 116, e.g., in a synchronous manner. In other cases, the scan engine 108 may send the high-level command 120 via an RPC call to the software agent 126 and the software agent 126 responds with the result 122 in another RPC call in the other direction, e.g., in an asynchronous manner.

At 210, the process may determine a fingerprint associated with the computing device based at least in part on the result. For example, in FIG. 1, the scan engine 108 may create one of the fingerprints 110 based on the result 122. The fingerprint 110 may identify traits associated with each computing device 102.

At 212, the process may determine, based on the fingerprint, whether a vulnerability is present or whether there is a policy violation present in the computing device. If the process determines, at 212, that a vulnerability or a policy violation is present in the computing device, then the process may proceed to 202, where another computing device of the plurality of computing devices may be selected. If the process determines, at 212, that neither a vulnerability nor a policy violation are present in the computing device, then the process may proceed to 214. For example, in FIG. 1, the result 122 may be used to determine a current fingerprint of a computing device, such as the computing device 102(N), and the current fingerprint compared with one or more previous fingerprints of the computing device or an expected fingerprint. If the current fingerprint differs by more than a threshold amount from one or more previous fingerprints or an expected fingerprint, then the process may determine that a vulnerability or a policy violation is present.

At 214, the process may perform one or more actions associated with the vulnerability or the policy violation and then return to 202 to select a next computing device of the plurality of computing devices. For example, in FIG. 1, the scan engine 108 may provide a report (e.g., to a system administrator) indicating that a vulnerability or a policy violation may be present. The process may be repeated until each of the plurality of computing devices have been scanned.

Thus, an application, such as a scan engine, executing on a client, may send a high-level command using a remote procedure call to a HTTPS endpoint on a computing device. A software agent executing on the computing device may monitor the HTTPS endpoint and receive the high-level command. The software agent may convert the high-level command into multiple low-level commands and execute individual ones of the low-level commands on the computing device without incurring any network usage. The software agent may send the accumulated result of executing the low-level commands as a single result or may send the result of executing each of the low-level commands. In this way, a single round trip of the network is performed, e.g., a high-level command is sent from a client, over a network, to a computing device, and a result of executing the high-level command is sent from the computing device and over the network back to the computing device. Thus, multiple round-trip network calls are avoided resulting in faster execution of the high-level command and significantly less usage of network resources.

FIG. 3 is a flowchart of a process 300 that incudes converting a high-level command into a plurality of low-level commands, according to some embodiments. The process 300 may be performed by the software agent 126 executing on individual computing devices of the computing devices 102(1) to 102(N) of FIG. 1.

At 302, a software agent executing on a computing device receives (e.g., via an HTTPS endpoint) a high-level command that is invoked by an application (e.g., a scan engine) executing on a client using a remote procedure call. For example, in FIG. 1, the software agent 126 listens to the HTTPS endpoint 124. When an application, such as the scan engine 108, on the client 104 sends the high-level command 120 to the HTTPS endpoint 124 using the remote procedure call 116, the software agent 126 receives the high-level command 120.

At 304, the software agent executing on the computing device converts the high-level command into a plurality of low-level commands. At 306, the software agent executing on the computing device executes an individual command of the plurality of low-level commands on the computing device. For example, in FIG. 1, after receiving the high-level command 120, the software agent 126 converts the high-level command 120 into multiple low-level commands 128. The software agent 126 selects an individual command of the multiple low-level commands 128 and executes the individual command on the computing device 102.

At 308, the software agent determines a result of executing the individual command. At 310, the software agent sends the result of executing the individual command. For example, in FIG. 1, the software agent 126 determines a result of executing one of the low-level commands 128 and sends the result 122 back to the scan engine 108.

At 312, the software agent determines whether each of the plurality of low-level commands has been executed. If the software agent determines, at 312, that "no" each of the plurality of low-level commands has not been executed, then the software agent proceeds back to 306 to execute another individual command of the plurality of low-level commands. If the software agent determines, at 310, that each of the plurality of low-level commands has been executed, then the process ends. For example, in FIG. 1, the software agent 126 determines a result of executing one of the low-level commands 128. In some cases, the software agent 126 may stream the individual results of executing the low-level commands 128 after each individual low-level command is executed. For example, a first result of executing a first low-level command may be sent to the scan engine 108, a second result of executing a second low-level command may be sent to the scan engine 108, and so on until the results of executing all of the low-level commands have been sent to the scan engine 108. In other cases, the software agent 126 may accumulate the result of executing each of the low-level commands 128 and send the accumulated result to the scan engine 108 (e.g., after the software agent 126 determines that all of the low-level commands 128 have been executed).

Thus, an application, such as a scan engine, executing on a client, may send a high-level command using a remote procedure call to a HTTPS endpoint on a computing device. A software agent executing on the computing device monitors the HTTPS endpoint and receives the high-level command. The software agent converts the high-level command into multiple low-level commands and executes individual ones of the low-level commands on the computing device without using the network. After the software agent has completed executing the low-level commands associated with the high-level command, the software agent sends the results of executing the low-level commands as a single result. In this way, a single round trip of the network is performed, e.g., a high-level command is sent from a client, over a network, to a computing device, and a result of executing the high-level command is sent from the computing device, over the network, back to the computing device. Thus, multiple round-trip network calls are avoided resulting in faster execution of the high-level command and significantly less usage of network resources.

Figure 4:
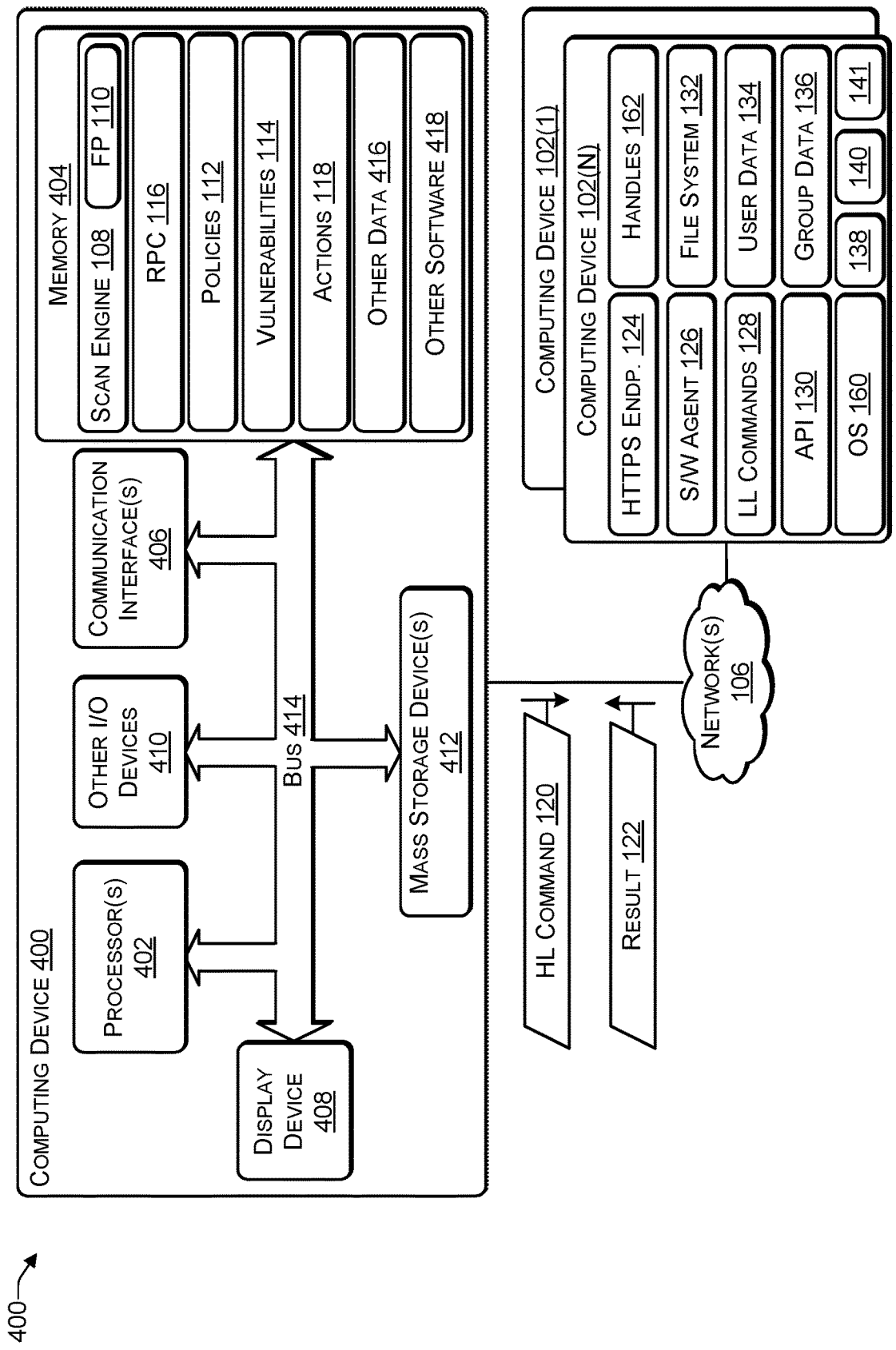
FIG. 4 illustrates an example configuration of a computing device that can be used to implement the systems and techniques described herein.

FIG. 4 illustrates an example configuration of a computing device 400 that can be used to implement the systems and techniques described herein, such as for example, the computing devices 102 of FIG. 1, the client 104, or both. For illustration purposes, the computing device 400 is illustrated in FIG. 4 as implementing the client 104 of FIG. 1.

The computing device 100 may include one or more processors 402 (e.g., central processing unit (CPU), graphics processing unit (GPU), or the like), a memory 404, communication interfaces 406, a display device 408, other input/output (I/O) devices 410 (e.g., keyboard, trackball, and the like), and one or more mass storage devices 412 (e.g., disk drive, solid state disk drive, or the like), configured to communicate with each other, such as via one or more system buses 414 or other suitable connections. While a single system bus 414 is illustrated for ease of understanding, it should be understood that the system buses 414 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, etc.

The processors 402 are one or more hardware devices that may include a single processing unit or a number of processing units, all of which may include single or multiple computing units or multiple cores. The processors 402 may include a graphics processing unit (GPU) that is integrated into the CPU or the GPU may be a separate processor device from the CPU. The processors 402 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 402 may be configured to fetch and execute computer-readable instructions stored in the memory 404, mass storage devices 412, or other non-transitory computer-readable media.

Memory 404 and mass storage devices 412 are examples of non-transitory computer storage media (e.g., memory storage devices) for storing instructions that can be executed by the processors 402 to perform the various functions described herein. For example, memory 404 may include both volatile memory and non-volatile memory (e.g., RAM, ROM, or the like) devices. Further, mass storage devices 412 may include hard disk drives, solid-state drives, removable media, including external and removable drives, memory cards, flash memory, floppy disks, optical disks (e.g., CD, DVD), a storage array, a network attached storage, a storage area network, or the like. Both memory 404 and mass storage devices 412 may be collectively referred to as memory or computer storage media herein and include any type of non-transitory media capable of storing computer-readable, processor-executable program instructions as computer program code that can be executed by the processors 402 as a particular machine configured for carrying out the operations and functions described in the implementations herein.

The computing device 400 may include one or more communication interfaces 406 for exchanging data via the network 106. The communication interfaces 406 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 406 can also provide communication with external storage, such as a storage array, network attached storage, storage area network, cloud storage, or the like.

The display device 408 may be used for displaying content (e.g., information and images) to users. Other I/O devices 410 may be devices that receive various inputs from a user and provide various outputs to the user, and may include a keyboard, a touchpad, a mouse, a printer, audio input/output devices, and so forth.

The computer storage media, such as memory 404 and mass storage devices 412, may be used to store software and data. For example, the computer storage media may be used to store on or more applications, such as the scan engine 108, the RPC 116, the set of policies 112, the set of vulnerabilities, the actions 118, other data 416, and other software 418.

The systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A method comprising:
   receiving, at a computing device and from a client that implements a scan engine that scans computers for security vulnerabilities, a high-level command to collect machine characteristics data about the computing device for a vulnerability assessment of the computing device, wherein the high-level command is a remote procedure call made by the scan engine to the computing device, wherein the high-level command is received via a network implemented over Internet and by a software agent executing on the computing device;
   converting, by the software agent, the high-level command into a plurality of low-level commands executable to collect the machine characteristics data about the computing device, wherein the low-level commands include operating system commands executable to collect:
   (a) contents of individual files of a plurality of files stored on the computing device,
   (b) metadata associated with the plurality of files, and
   (c) a plurality of user identifiers of users that are permitted to access the computing device;
   executing, by the software agent, the plurality of low-level commands on the computing device;
   determining, by the software agent, a result of executing the low-level commands on the computing device; and
   sending, over the network and by the software agent, the result of executing the low-level commands on the computing device to the client.

2. The method of claim 1, wherein the low-level commands are executable to collect an operating system version of the computing device.

3. The method of claim 1, wherein the result comprises one of:
   the contents of the individual files stored on the computing device;
   the metadata associated with the files;
   the plurality of user identifiers of users that are permitted to access the computing device;
   a plurality of user permissions associated with users having access to the computing device;
   a plurality of group names associated with groups defined on the computing device;
   a plurality of group identifiers associated with one or more groups defined on the computing device;
   a plurality of group permissions associated with one or more groups defined on the computing device;
   group membership data associated with one or more groups defined on the computing device;
   registry data associated with an operating system registry of the computing device; or
   an output of executing a command line application on the computing device.

4. The method of claim 1, wherein the software agent executes the low-level commands on the computing device as a shell script.

5. The method of claim 1, wherein a single roundtrip across the network that connects the client to the computing device comprises:
   receiving, by the software agent executing on the computing device, the high-level command from the client; and
   sending, by the software agent, the result to the client.

6. The method of claim 1, wherein
   the result is sent to the client as a response to the remote procedure call.

7. The method of claim 1, wherein:
   the result is sent to the client as a second remote procedure call invoked by the software agent.

8. A computing device comprising:
   one or more processors; and
   one or more non-transitory computer readable media storing instructions executable by the one or more processors to perform operations comprising:
   receiving, at the computing device and from a client that implements a scan engine that scans computers for security vulnerabilities, a high-level command to collect machine characteristics data about the computing device for a vulnerability assessment of the computing device, wherein the high-level command is a remote procedure call made by the scan engine to the computing device, wherein the high-level command is received via a network implemented over Internet and by a software agent executing on the computing device;

converting the high-level command into a plurality of low-level commands executable to collect the machine characteristics data about the computing device, wherein the low-level commands include operating system commands executable to collect:
(a) contents of individual files of a plurality of files stored on the computing device,
(b) metadata associated with the plurality of files, and
(c) a plurality of user identifiers of users that are permitted to access the computing device;

executing the plurality of low-level commands on the computing device;

determining a result of executing the low-level commands on the computing device; and sending, over the network and by the software agent, the result of executing the low-level commands on the computing device to the client.

9. The computing device of claim 8, wherein the low-level commands are executable to collect an operating system version of the computing device.

10. The computing device of claim 8, wherein receiving, by the software agent executing on the computing device, the high-level command from the client comprises:
receiving the high-level command at a Hypertext Transfer Protocol Secure (HTTPS) endpoint on the computing device.

11. The computing device of claim 8, wherein the result comprises one of:
the contents of the individual files stored on the computing device;
the metadata associated with the files;
the plurality of user identifiers of users that are permitted to access the computing device;
a plurality of user permissions associated with users that are permitted to access the computing device;
a plurality of group names associated with groups defined on the computing device;
a plurality of group identifiers associated with one or more groups defined on the computing device;
a plurality of group permissions associated with one or more groups defined on the computing device;
group membership data associated with one or more groups defined on the computing device;
registry data associated with an operating system registry of the computing device; or
an output of executing a command line application on the computing device.

12. The computing device of claim 8, wherein:
the result is sent to the client as a response to the remote procedure call.

13. The computing device of claim 8, wherein a single roundtrip across the network that connects the client to the computing device comprises:
receiving, by the software agent executing on the computing device, the high-level command from the client; and
sending, by the software agent, the result to the client.

14. One or more non-transitory computer readable media storing instructions executable by one or more processors of a computing device to perform operations comprising:
receiving, at a computing device and from a client that implements a scan engine that scans computers for security vulnerabilities, a high-level command to collect machine characteristics data about the computing device for a vulnerability assessment of the computing device, wherein the high-level command is a remote procedure call made by the scan engine to the computing device, wherein the high-level command is received via a network implemented over Internet and by a software agent executing on the computing device;

converting the high-level command into a plurality of low-level commands executable to collect the machine characteristics data about the computing device, wherein the low-level commands include operating system commands_executable to collect:
(a) contents of individual files of a plurality of files stored on the computing device,
(b) metadata associated with the plurality of files, and
(c) a plurality of user identifiers of users that are permitted to access the computing device;

executing the plurality of low-level commands on the computing device;

determining a result of executing the low-level commands on the computing device; and sending, over the network and by the software agent, the result of executing the low-level commands on the computing device to the client.

15. The one or more non-transitory computer readable media of claim 14, wherein the low-level commands are executable to collect an operating system version of the computing device.

16. The one or more non-transitory computer readable media of claim 14, wherein:
the result is sent to the client as a second remote procedure call invoked by the software agent.

17. The one or more non-transitory computer readable media of claim 14, wherein the result comprises one of:
the contents of the individual files stored on the computing device;
the metadata associated with the files;
the plurality of user identifiers of users that are permitted to access the computing device;
a plurality of user permissions associated with users that are permitted to access the computing device;
a plurality of group names associated with groups defined on the computing device;
a plurality of group identifiers associated with one or more groups defined on the computing device;
a plurality of group permissions associated with one or more groups defined on the computing device;
group membership data associated with one or more groups defined on the computing device;
registry data associated with an operating system registry of the computing device; or
an output of executing a command line application.

18. The one or more non-transitory computer readable media of claim 14, wherein the software agent executes the low-level commands on the computing device as a shell script.

19. The one or more non-transitory computer readable media of claim 14, wherein a single roundtrip across the network that connects the client to the computing device comprises:
receiving, by the software agent executing on the computing device, the high-level command from the client; and
sending, by the software agent, the result to the client.

20. The one or more non-transitory computer readable media of claim 14, wherein:
  the result is sent to the client as a response to the remote procedure call.

\* \* \* \* \*